United States Patent [19]

Tusche

[11] Patent Number: 4,958,436
[45] Date of Patent: Sep. 25, 1990

[54] TRAILER HITCH GUIDE

[76] Inventor: Karl J. Tusche, R.D. #1, Box 347, Easton, Pa. 18042

[21] Appl. No.: 347,230

[22] Filed: May 4, 1989

[51] Int. Cl.$^5$ .............................................. B60Q 1/26
[52] U.S. Cl. ................... 33/264; 116/28 R; 280/477
[58] Field of Search ............... 33/264, 263; 116/28 R; 280/477

[56] References Cited

U.S. PATENT DOCUMENTS

| | | | |
|---|---|---|---|
| D. 270,906 | 10/1983 | Orr | D12/162 |
| D. 279,092 | 6/1985 | Snaper | D12/162 |
| 3,064,617 | 11/1962 | Meagher | 33/264 |
| 3,765,703 | 10/1973 | Voelkerding et al. | 116/28 R |
| 3,863,594 | 2/1975 | Gawthrop | 33/264 |
| 3,866,328 | 2/1975 | Alexander et al. | 33/264 |
| 3,901,536 | 8/1975 | Black | 280/477 |
| 3,918,746 | 11/1975 | Lehtisaari | 33/264 |
| 4,583,481 | 4/1986 | Garrison | 33/264 |
| 4,708,359 | 11/1987 | Davenport | 280/477 |
| 4,741,111 | 5/1988 | Emerick | 33/264 |

Primary Examiner—William A. Cuchlinski, Jr.
Assistant Examiner—Christopher W. Fulton
Attorney, Agent, or Firm—T. M. Gernstein

[57] ABSTRACT

A trailer hitch guide includes a plurality of visual guides that are stored in an out-of-the way location and are deployed automatically as the element being carried on the trailer moves off of that trailer. The visual guides are located to provide an exact positional readout to the vehicle driver, and a template can be mounted within the vehicle to quantify the amount of misalignment between the vehicle and the trailer. Mispositioning of the vehicle in a single plane can be indicated and mispositioning of the vehicle plane with respect to the trailer plane can also be indicated.

2 Claims, 4 Drawing Sheets

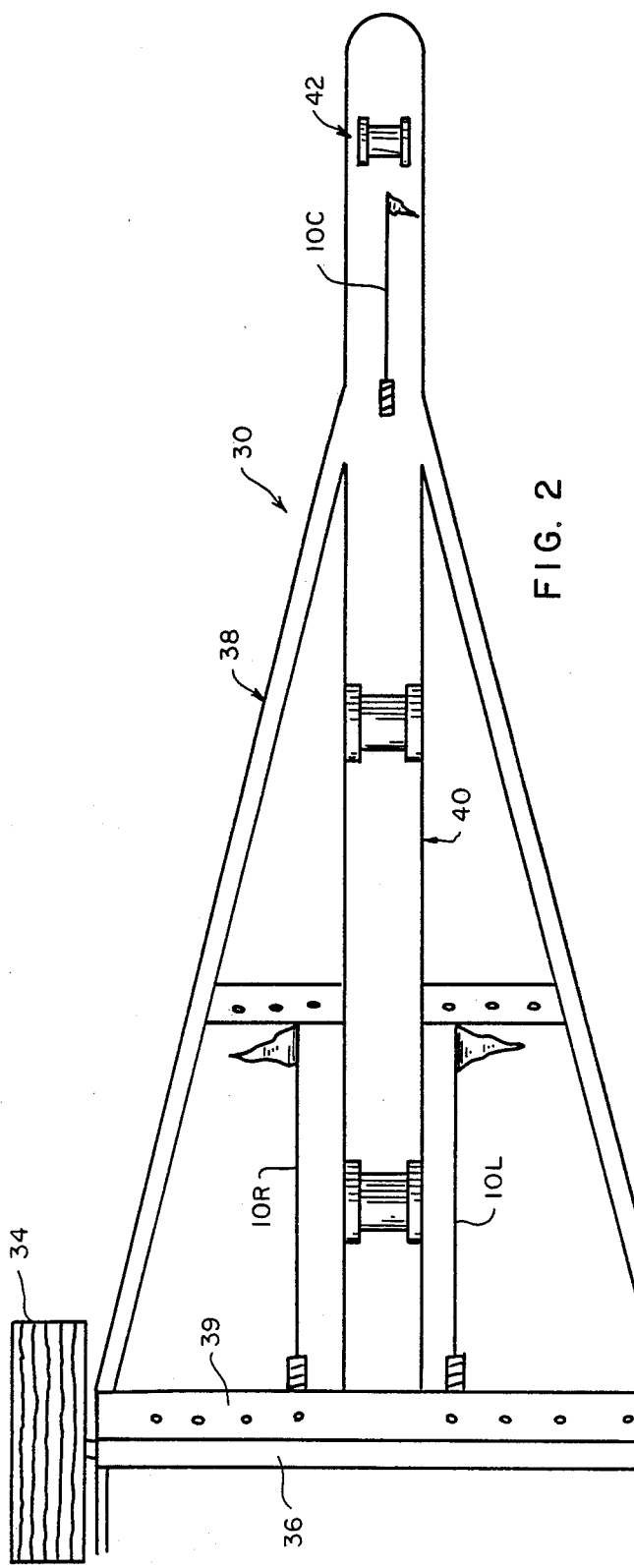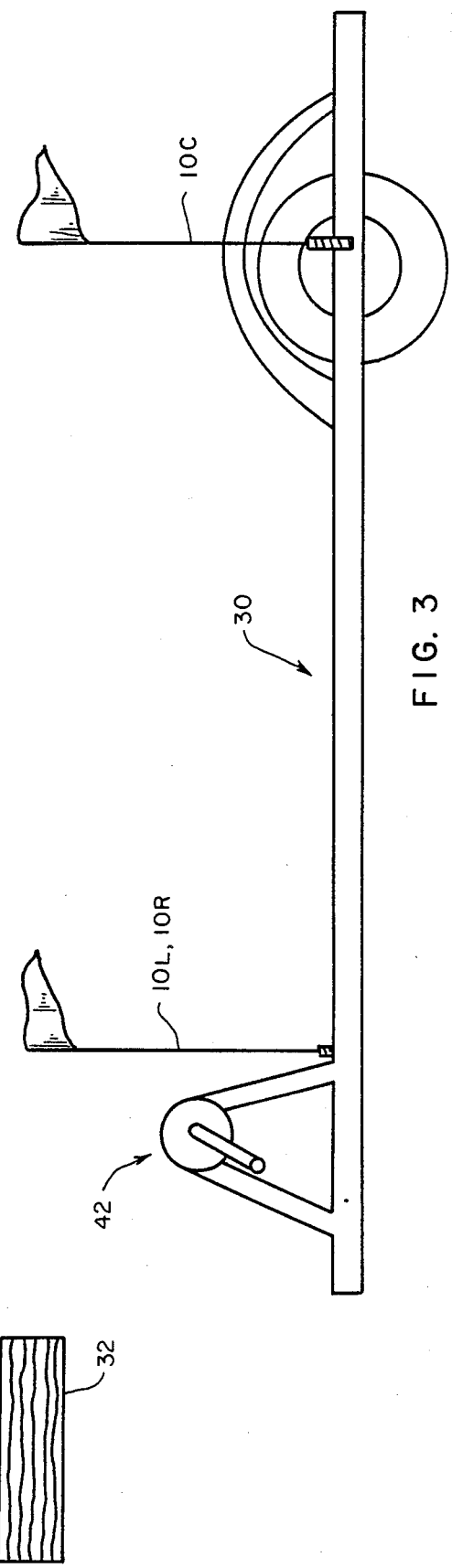

TRAILER HITCH GUIDE

TECHNICAL FIELD OF THE INVENTION

The present invention relates to the general art of land vehicles, and to the particular field of automotive accessories. Specifically, the present invention relates to automotive accessories used to connect a vehicle to a trailer.

BACKGROUND OF THE INVENTION

The use of trailers that are drawn by automotive vehicles has increased tremendously in the recent years, and during this period a variety of trailer hitches have been developed, with the most commonly used trailer hitch being one that includes a spherical ball member supported in an upwardly extending position from a rear element of the vehicle, and which is adapted to be engaged by a semi-cylindrical socket supported on a forward element of the trailer. The socket is adapted to be detachably attached to the ball to permit the trailer to be pulled by the vehicle.

While this type of trailer hitch is quite satisfactory, the disadvantage thereof as well as the disadvantage of other similar hitches having different designs is that when they are used for pulling a trailer by a vehicle, the driver of the vehicle cannot see the hitch such that it is extremely difficult and quite frustrating for the driver of the vehicle to maneuver the vehicle in a manner to initially vertically align the two hitch portions so that they may be placed in engagement. This is especially critical when the trailer is of the house trailer type and is so heavy that it is difficult if not impossible to shift the position of the trailer by hand such that it is important that the vehicle be brought into the exact position and orientation necessary to properly couple the trailer to the vehicle.

In the case of a boat trailer, such trailer is often located in a different plane than the vehicle, thereby making such alignment and orientation that much more difficult for the vehicle driver.

These difficulties are such that even highly skilled and experienced drivers often require the assistance of a second individual who is located outside the vehicle where such individual can view the two hitches, and who will then tell the vehicle driver which way to steer the vehicle to effect the proper positioning and orientation of the vehicle hitch elements with respect to the trailer hitch elements.

While this method is effective, it is not entirely satisfactory since the driver is required to concentrate and view several different signals at the same time as well as control the vehicle.

Accordingly, there have been many proposals for assisting a vehicle driver in aligning his vehicle with the trailer to permit a proper connection of the vehicle to the trailer via the hitch elements mounted on each. These proposals have ranged from simple flags to complicated guidance mechanisms.

While somewhat successful in certain cases, these prior proposals have each suffered various drawbacks that have inhibited the full commercial acceptance of such devices.

For example, the simple devices, such as the flags, have often left too much to the judgement of the driver and, as such, have been little better than no guide at all. It must be remembered that the vehicle driver is backing up, often in difficult terrain, and is trying to maneuver his vehicle with respect to another object that may be located in an entirely different plane. This operation is difficult even for experienced professional truck drivers, let alone a non-professional driver. The use of a simple flag generally includes merely providing a target for the driver to aim at during the backing up procedure. A simple target simply does not provide enough guidance for most drivers. Too much is left to his judgement of the position and orientation of his vehicle with respect to the trailer hitch when all that is provided is a guide or target.

On the other hand, however, other guide means have been so complicated as to be prohibitive in their use either from a cost aspect or from the installation aspect or simply from a use aspect. If the device is too expensive to purchase, too difficult to install or too difficult to use, it will not enjoy great acceptance in this market since many people are so used to the frustrations and difficulties of this maneuver that they simply accept them as part of the price to be paid for the enjoyment of the sport or activity, and thus will not pay the price for expensive or difficult-to-use devices.

A still further problem with many existing trailer hitch guides is that they are in the way when they are not in use. Such devices are often disconnected and then re-connected when the hitching operation is to begin. This is an onerous task that will prevent many trailer owners from purchasing such a device. If the device is in the way when it is not in use, this also will discourage purchase and thus inhibit the full commercial success of such devices.

Therefore, there is a need for a trailer hitch guide device that is inexpensive to purchase, simple to install and use, and yet provides a great deal of guidance to a driver of a vehicle so that such driver is not forced to exercise an undue amount of judgement in the coupling of his vehicle to a trailer.

OBJECTS OF THE INVENTION

It is a main object of the present invention to provide a trailer hitch guide which requires a vehicle driver to exercise only a minimal amount of judgement during a vehicle-trailer hitching operation.

It is another object of the present invention to provide a trailer hitch guide which is inexpensive to purchase.

It is another object of the present invention to provide a trailer hitch guide that is easily installed on a trailer.

It is another object of the present invention to provide a trailer hitch guide that is out of the way when it is not in use.

SUMMARY OF THE INVENTION

These, and other, objects are achieved by a trailer hitch guide device that includes a plurality of visual guides that are flexibly mounted on a trailer in a pattern that can be used in a precise technique to align and orient a vehicle with respect to the trailer hitch elements in a plurality of planes. A template is mounted in the vehicle and is used by the driver to ensure that his vehicle is properly oriented and positioned to effect a proper coupling of the trailer hitch elements.

The visual guides are mounted on the trailer using existing elements, and are mounted to be easily and automatically stored out of the way when the device being towed is in place on the trailer.

In this manner, the guide device of the present invention is inexpensive since it uses existing equipment, easy to install on such equipment, and is located out of the way when it is not in use so it can remain connected at all times and need not be removed between uses.

The device further has means for telling the vehicle driver exactly where he is in relation to the position and orientation of the trailer hitch elements so he can adjust his vehicle position and orientation accordingly. The guide of the present invention thus provides more than a mere target, and truly provides guidance to the driver.

DESCRIPTION OF THE FIGURES

FIG. 2 is a top plan view of a trailer having the visual guides of the present invention mounted thereon.

FIG. 3 is a side elevational view of a trailer having the visual guides of the present invention mounted thereon.

DETAILED DESCRIPTION OF THE PREFERRED EMBODIMENT OF THE INVENTION

Figure 1:
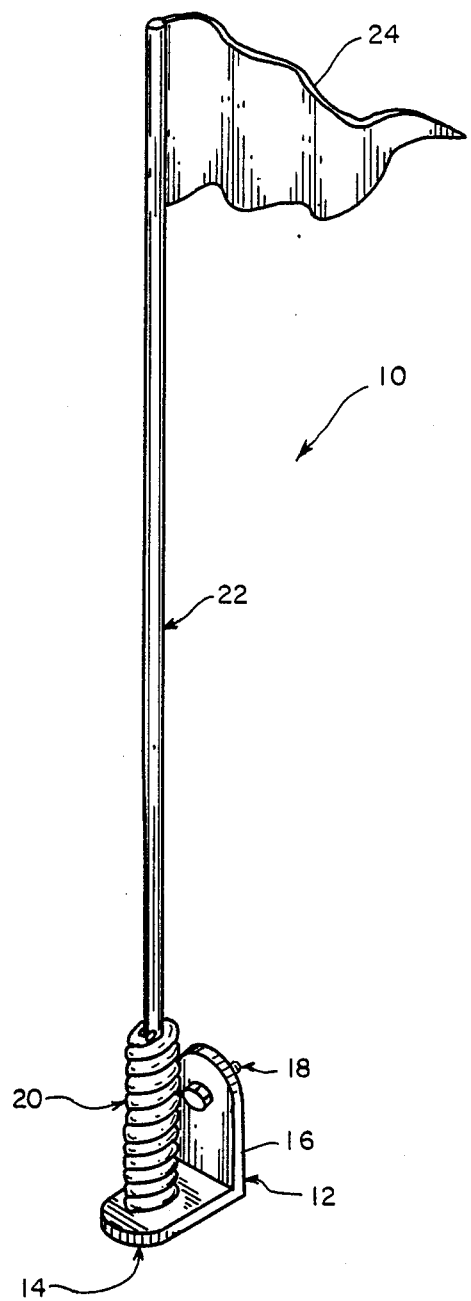
FIG. 1 is a perspective of a visual guide used in the trailer hitch guide device of the present invention.

Shown in FIG. 1 is a visual guide 10 that is adapted to be mounted on a trailer that is used to tow items, such as boats, or the like. The visual guide 10 includes an L-shaped mounting bracket 12 that has a base 14 and a mounting back 16. A fastener, such as a bolt 18 is used to attach the bracket 12 to an element of the trailer.

The visual guide 10 further includes a spring connector 20 affixed at one end thereof to the base 14 to extend upwardly therefrom, and a rod 22 is attached to the spring connector 20 at a lower end of that rod to extend upwardly from the bracket as shown in FIG. 1. A visual indicator, such as a flag 24 is attached to the rod at another end of that rod. The rod is long enough to make the flag visible to a vehicle driver during a hitching operation when the bracket 12 is mounted on the trailer.

The spring connector 20 is such that the rod can assume a position which is vertically oriented with respect to the bracket as shown in FIG. 1, or can assume a repose position that is oriented approximately 90 degrees with respect to the Figure 1 position so that the rod is essentially co-planar with the bracket base 14.

The visual guide 10 is thus formed of inexpensive elements and is easily installed, and can assume a variety of positions so it can be stored out of the way when it is not in use.

Referring next to FIGS. 2 and 3, a trailer 30 is shown having the visual guides of the present invention installed thereon. As shown, the trailer 30 includes a pair of wheels 32 and 34 mounted on an axle 36 and a boat supporting frame 38. The supporting frame 38 includes a center bar 40 that extends along the longitudinal centerline of the trailer. The trailer hitch element is mounted on the center bar 40 to be on the longitudinal centerline of the trailer.

As was mentioned above, the towing vehicle will be provided with a trailer hitch element which includes a rearwardly extending rigid member which is rigidly affixed to the vehicle and on which there is supported a spherical ball. The ball has a vertical shaft portion which extends through the support member and terminates at a bottom portion projecting beneath the support member. The trailer hitch element forms a second portion of the hitch. This second portion includes a supporting plate member affixed to the trailer center bar and projects forwardly. The trailer hitch element is provided with a downwardly facing socket recess-forming element that is adapted to be detachably attached to the vehicle ball element and to be secured thereto by a suitable lock. A suitable winch 42 can also be included.

As is shown in FIGS. 2 and 3, there are three visual guides mounted on the trailer 30 in a triangle pattern with one apex located immediately adjacent to the trailer hitching element.

Thus, the trailer hitch guide device of the present invention includes a two visual guides 10L and 10R mounted on a cross bar 39 of the trailer to be located on opposite sides of the center bar 40 to be located on opposite sides of the trailer hitch element. The trailer hitch element will thus bisect a line drawn between the visual guides 10L and 10R as viewed from along the center bar of the trailer. These two visual guides thus serve to locate the trailer hitch elements.

The trailer hitch guide device further includes a third visual guide 10C located immediately adjacent to the trailer hitch element. This combination of visual guides 10R, 10L and 10C forms an isosceles triangle with the equal legs thereof being formed by apexes 10L/10C and 10R/10C with the apex 10C being at the midpoint between the apexes 10R and 10C. Thus, a projection of the three visual guides onto a plane containing the cross bar 39 and extending through the centerline of such cross bar will be a linear configuration with the guide 10C located midway between the guides 10L and 10R.

The visual guides 10R and 10L are mounted using the brackets 12, and the visual guide 10C is mounted using only the spring mount 20. All of the visual guides thus are adapted to assume a deployed position that is upright with respect to the plane containing the center bar 40, as indicated in FIG. 3, and a stored condition that is essentially coplanar with respect to the plane containing the center bar 40, as is indicated in FIG. 2.

Figure 4:
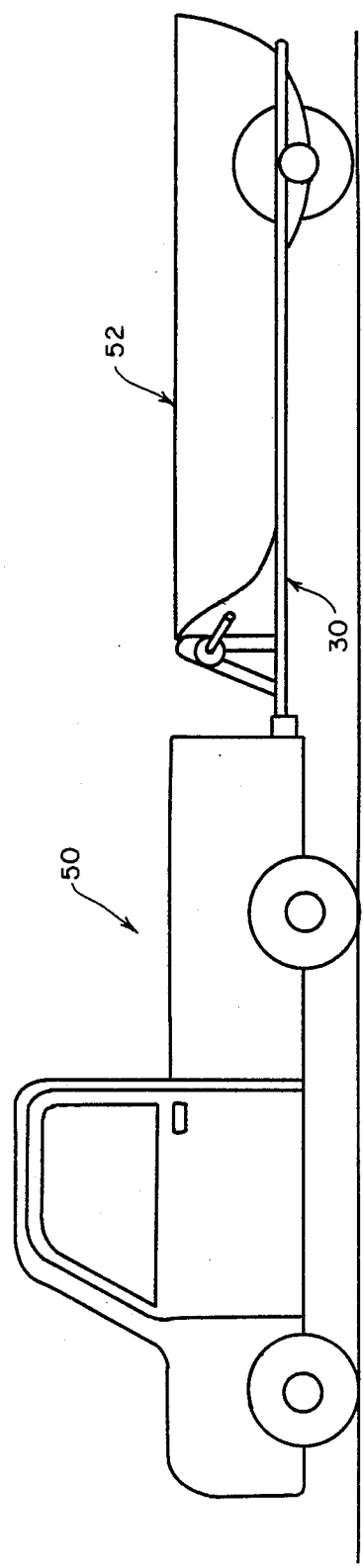
FIG. 4 is a side elevational view of a vehicle towing a trailer having the trailer hitch guide device of the present invention in the stored condition.
Figure 5:
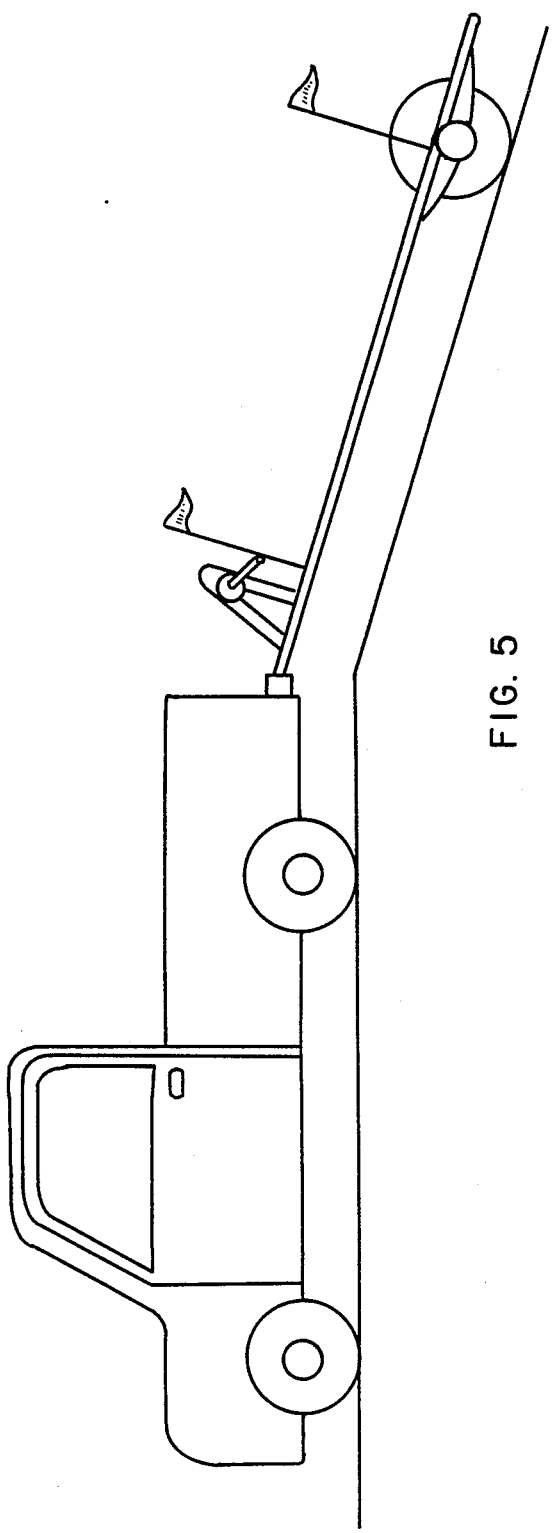
FIG. 5 is a side elevational view of a vehicle and a trailer that are located in different planes.

The stored and deployed configurations of the visual guides is also apparent in FIGS. 4 and 5 in which a vehicle 50 is towing a boat 52 on the trailer 30. In the towing configuration, the vehicle has a centerline that is aligned with the longitudinal centerline of the trailer. In the FIG. 4 showing, the boat is already aboard the trailer and thus is depressing the visual guides down into a stored configuration co-planar with the trailer centerbar. In the FIG. 5 showing, the trailer is shown in a plane that is different from the plane containing the vehicle 50 and the trailer is empty so that there is no force depressing the visual guides. Accordingly, the visual guides are upright with respect to the trailer and can be easily seen by the driver from the vehicle.

Figure 6:
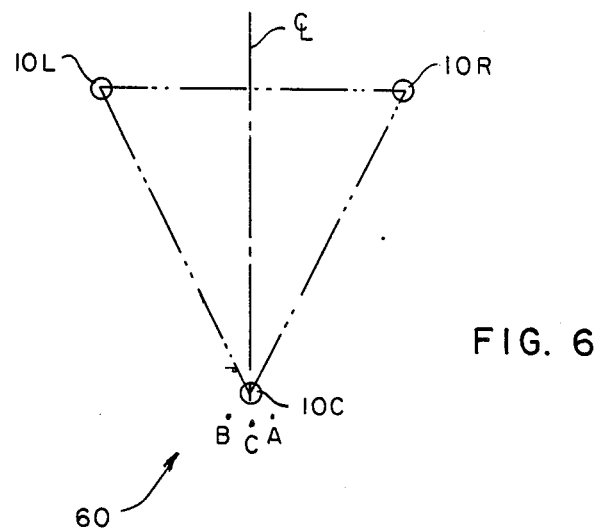
FIG. 6 is a schematic of a triangle formation of the visual guides of the present invention and how such triangle formation is used to guide the position and orientation of a vehicle in relation to a trailer during a hitching operation.
Figure 7:
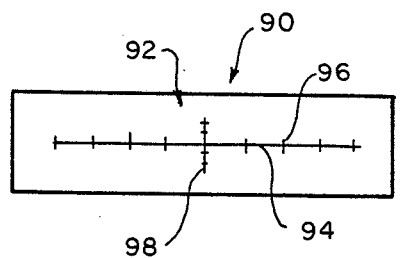
FIG. 7 shows a template used in conjunction with the visual guides of the present invention to guide the positioning and orienting of a vehicle with relation to a trailer in a hitching operation.

The triangle guidance system of the device is best indicated in FIGS. 6–10, and attention is now adverted to such figures. As indicated in FIG. 6, the visual guides 10L. 10R and 10C define an isosceles triangle and form a pattern with the guide 10C located between the guides 10L and 10R when viewed from position 60 as the vehicle is being coupled to the trailer hitch element. The various orientations and positions with which the vehicle can approach the trailer are indicated at position 60 by the indicators A, B and C. The positions can vary from one side of the trailer longitudinal centerline CL which, due to the above-discussed positioning of the visual guide devices, will be on the line bisecting the distance between the guides 10R and 10L and will extend through the guide 10C, to the other side in the horizontal plane (the plane of the paper), and can be at various other positions above and below the center bar in a vertical plane (the plane into and out of the paper). Such variations should be avoided if a proper coupling between the trailer and the vehicle is to be effected, and the visual guide device of the present invention helps a vehicle driver avoid such improper positioning and orientation.

By viewing the visual guides from position 60, the above-mentioned orientation of the guide 10C with respect to guides 10R and 10L will vary in appearance if the viewing is moved from position A to position B or to position C, with only a co-planar view of the guides from position C providing the above-discussed orientation of guide 10C being co-planar with and intermediate the guides 10R and 10L.

Thus, if the viewing position is co-planar with the plane containing the guides, the guide 10C will appear to be co-planar with the guides 10R and 10L; however, if the viewing position is not co-planar with the plane containing and defined by the guides, the position of guide 10C will appear to be out of the plane of guides 10L and 10R, either above such plane or below it, depending on whether the viewing position is below or above the plane of the guides.

Furthermore, if the viewing position is not aligned with the centerline CL, the guide 10C will appear to be closer to guide 10L or to guide 10R, depending on whether the viewing position is from location A or location B, with only location C on the longitudinal centerline CL locating guide 10C intermediate guides 10L and 10R.

Using this property of the guide device, a vehicle driver can understand his exact orientation with respect to the trailer hitch element in at least two planes as well as his position with respect to that trailer hitch element by simply viewing the guides from his vehicle.

Figure 9:
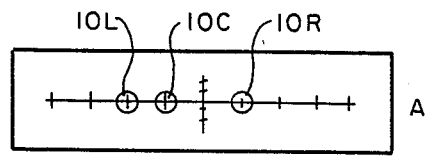
FIG. 9 shows the template when the vehicle hitch elements are improperly aligned and/or improperly positioned with respect to the trailer hitch elements.

The device of the present invention further incudes a template 90 for further assisting the vehicle driver in the above-discussed orienting and positioning of his vehicle with respect to the trailer. The template is shown in FIG. 9, and includes means for mounting that template inside the vehicle. The template is preferably clear so it can be mounted on the rear view mirror, or on the rear window of the vehicle without unduly interfering with the driver's vision.

The template 90 includes a cross-hair type target 92 having a longitudinal center line 94 and additional lines, such as vertical line 96 oriented transversely to the centerline 94 and spaced apart from each other along the center line 94 at prescribed horizontal distances, and further lines 98 spaced apart from the center line 94 prescribed vertical distances. By viewing the guides 10L, 10R and 10C through the template, the amount of misalignment between the vehicle and the trailer can be quantified so the vehicle driver can adjust and correct his course according to quantified amounts rather than simply guessing and judging the amount of correction needed. Furthermore, due to the just-described planar orientation of the guides, planar corrections can be effected as well as positional corrections within a plane.

Figure 8:
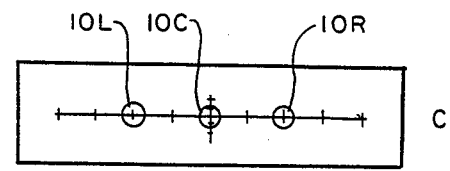
FIG. 8 shows the template when the vehicle hitch elements are properly oriented and positioned with respect to the trailer hitch elements.
Figure 10:
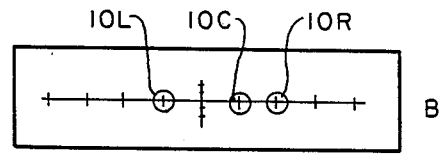
FIG. 10 shows the template when the vehicle hitch elements are improperly aligned and/or improperly positioned with respect to the trailer hitch elements in another direction with respect to the improper alignment and/or orientation shown in FIG. 9.

Examples of such multi-planar corrections are shown in FIGS. 8, 9 and 10. FIG. 8 indicates a co-planar and centered view of the guides along the centerline CL as it would appear in the template 90; whereas, FIGS. 9 and 10 indicate off-center positions within a single plane (FIG. 10 as seen from location B) and an off-center position and a planar misalignment (FIG. 9 as seen from location C and below the plane containing the guides).

The spaced lines 96 and 98 can be used to quantify the misalignment indicated in FIGS. 9 and 10 to remove the guesswork associated with the coupling operation.

While a boat towing operation has been disclosed, such disclosure is for the sake of example only, and is not intended to be limiting.

It is understood that while certain forms of the present invention have been illustrated and described herein, it is not to be limited to the specific forms or arrangements of parts described and shown.

I claim:

1. A trailer hitch guide device for visually assisting a driver in maneuvering a vehicle having a centerline and a first engageable portion of a trailer hitch mounted thereon to a position relative to a trailer having a centerline and a second engaging portion of such trailer hitch so as to align the trailer hitch portions in position to·be removably engaged to couple the trailer to the vehicle, comprising:

a plurality of visual guides mounted on a structural element of the trailer, said visual guides being located on the trailer in positions to be visible to the vehicle driver and being positioned to be used by that driver in aligning the vehicle engageable portion of the trailer hitch with the second engageable portion of the trailer hitch, two of said visual guides being positioned adjacent to the centerline of the trailer and being located on opposite sides of that trailer centerline, each of said visual guides including
(1) a bracket which is mounted on the trailer,
(2) a spring mounted on said bracket,
(3) a rod connected at one end thereof to said spring to be flexibly mounted on the trailer, and
(4) a visible indicator connected to said rod,
said rod flexible mounting being arranged to permit said rod to move from a first position which is essentially co-planar with the trailer structural element to a second position which is essentially upright with respect to said first position; and
a third visual guide mounted on the trailer between the trailer hitch mounted second engaging portion and said two visual guides and forming a triangle with said two visual guides, with said visual guides forming an isosceles triangle, said isosceles triangle including equal legs extending from said third visual guide to each of said two visual guides, and a transparent guide template mounted on a rear view mirror of the vehicle, said template including
  (1) guide lines for use by the driver in determining the planar position of the vehicle with respect to the trailer,
  (2) second guide lines for use by the driver in determining the out-of-plane position of the vehicle with respect to the trailer, and
  (3) means for mounting said guide template on said rear view mirror.

2. The trailer hitch guide device defined in claim 1 further including a transparent guide template mounted on a rear window of the vehicle.

* * * * *